Nov. 21, 1961 J. W. HENNEN 3,009,473
SNAP-IN DAMPER
Filed Sept. 15, 1958
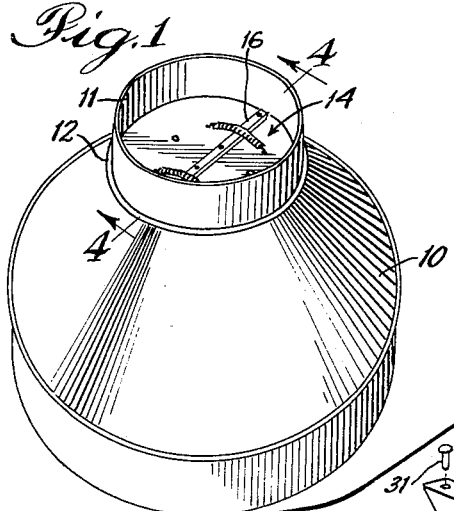
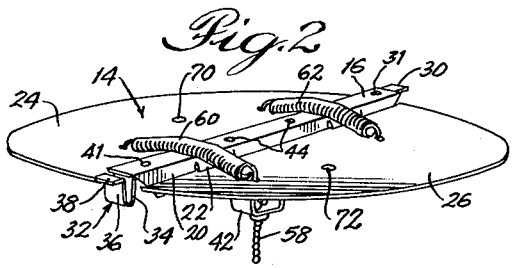
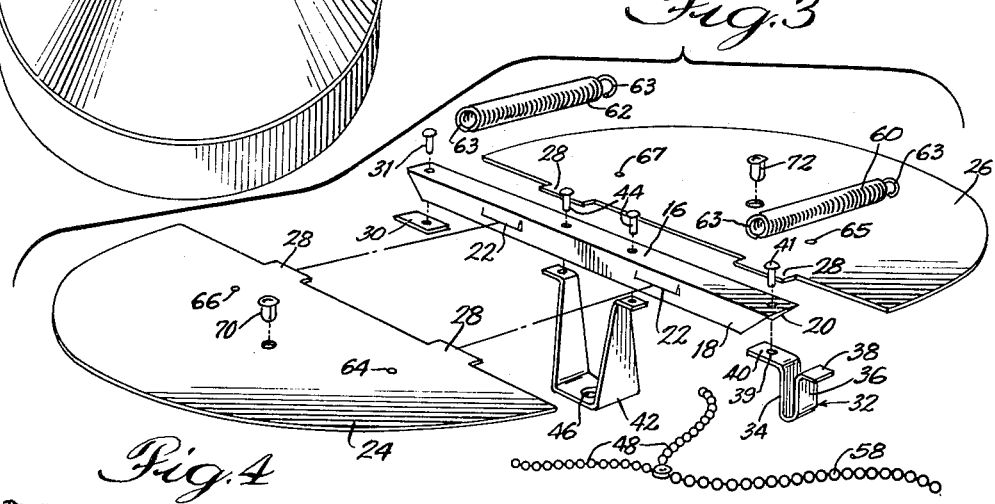
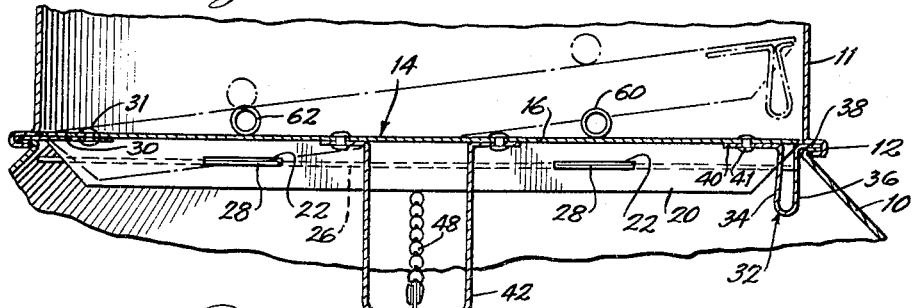
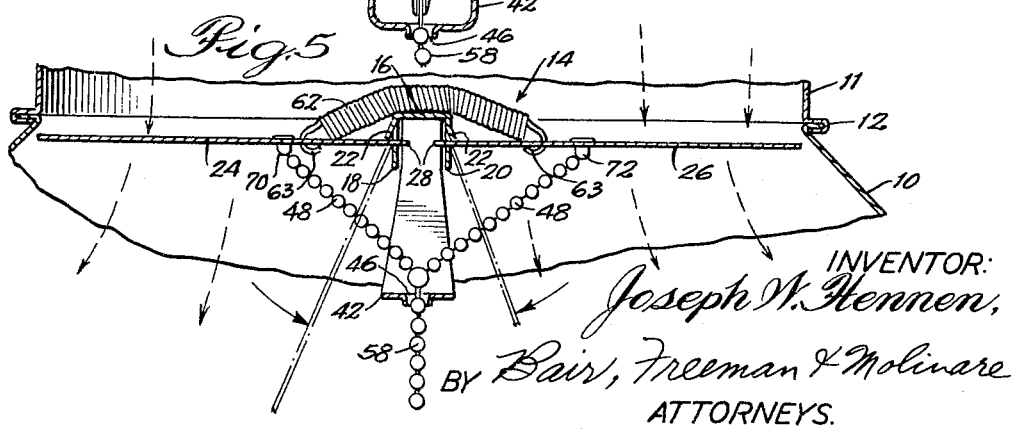
INVENTOR:
Joseph W. Hennen,
BY Bair, Freeman & Molinare
ATTORNEYS.

United States Patent Office 3,009,473
Patented Nov. 21, 1961

3,009,473
SNAP-IN DAMPER
Joseph W. Hennen, Omaha, Nebr., assignor to Standard Manufacturing Co., Omaha, Nebr., a corporation of Nebraska
Filed Sept. 15, 1958, Ser. No. 761,091
6 Claims. (Cl. 137—315)

This invention relates to a damper for air ducts which is adapted to snap into place within any portion of the duct which contains an internal groove as for example where two duct sections are joined together or where a duct section is joined to a fitting such as an elbow.

The primary object of the invention is to provide a damper of the "snap-in" type which is simple in construction, dependable in operation and capable of being inserted and removed from the duct without using any tools. The damper construction of the invention fits into any joint, such as the joint between the collar and the diffuser box, or into any similar groove or preformed dimple in the wall of the duct.

Another object is to provide a damper of the butterfly type in which the central beam or channel member, to which the leaves are pivotally connected, is locked against rotation after insertion in the duct.

In a preferred form of the invention the damper takes the form of a butterfly having a pair of semi-circular wings or leaves, one hinged to either side of a central beam adapted to extend diametrically across a duct through which fluid flow control is desired. A flat finger-like element is rigidly secured to one end of the beam and a leaf spring member having a similar terminal element is secured to the other end. The spring is depressible in a direction longitudinally of the beam so the terminal finger will snap into a groove within the duct. The stationary finger-like element fits into the same groove at the opposite side of the duct. These and other objects of the invention will appear more clearly from the following description when read in connection with the accompanying drawing, wherein:

FIGURE 1 is a perspective view of a ceiling diffuser box showing the damper of the invention inserted therein;

FIGURE 2 is a perspective view of a butterfly damper constructed in accordance with the invention;

FIGURE 3 is an exploded perspective view of the damper shown in FIGURE 2;

FIGURE 4 is an enlarged section taken along the line 4—4 of FIGURE 1 (longitudinally through the central beam). The damper is shown partly inserted within the duct in broken lines; and FIGURE 5 is a sectional view of the damper shown in FIGURE 1 taken at 90° to the central beam. The wings or leaves may be drawn together as shown in broken lines.

Referring now to FIGURE 1 of the drawing, the butterfly damper of the invention is shown inserted in the restricted portion or neck 11 of a standard ceiling diffuser box designated generally by the numeral 10. Where the neck 11 joins the body portion 10 there is a V-shaped groove 12 formed by the interlocking edges of the parts. This groove, or its equivalent, serves to support the damper within the opening, as will appear from the following description.

The damper illustrated in the drawing is of the "butterfly" type and has a pair of leaves or wings 24, 26 which are hingedly secured to a central beam or U-shaped channel member 16, shorter in length than the diameter of the duct in which the damper fits. The channel 16 has downwardly turned flanges 18, 20, each of which contains a pair of spaced slots 22 adapted to receive tabs 28 projecting from the straight edge of the semi-circular leaves 24, 26. The tabs 28 are held within the slots 22 by means of coil springs 60, 62 which urge the leaves together. Each of the coil springs has a hook 63 at either end thereof which is disposed within an opening provided therefor through the leaf. The hooks on springs 62 are inserted in openings 66, 67 while the hooks on spring 60 are inserted within the openings 64 and 65. These coil springs are in tension and, consequently, urge the leaves into engagement with the central beam 16. Thus, the leaves may be moved downwardly, as best illustrated by the broken lines in FIGURE 5, and held against the force of the springs to regulate the size of the opening, and consequently, the rate of air flow, through the duct in which the damper is inserted.

Convenient means for adjusting the position of the leaves is provided by means of a chain pull 48, 58. The ends of the branch chains 48 are secured within the cups 70, 72 fixed within the leaves 24, 26. A bracket 42 riveted to the central beam 16 by means of rivets 44, and having an opening 46 in the horizontal portion thereof, serves as a guide for the chain 58. As the chain 58 is pulled downwardly through the opening 46, the branch chains 48 cause the leaves 24 and 26 to be pulled together against the tension of springs 60, 62. When the tension on chain 58 is released, the springs cause the leaves to retract to normal position to close the damper.

The central beam 16 has a finger element 30 made from a flat sheet or ribbon of spring steel riveted securely to one end thereof. The finger 30 is of sufficient thickness to fit snugly into the groove normally provided in the duct at any joint. The width of the rigid finger 30 is preferably great enough to prevent rotation of the central beam within the opening of the duct and thus insure a rigid installation. It will be understood that reference to a "rigid" finger 30 simply means that it does not move axially of the beam 16. It does flex somewhat in a direction normal to the plane of the damper. Riveted to the other end of the central beam 16 by means of rivet 41 is a similar flat finger 38 comprising the terminal portion of a leaf spring designated generally by the numeral 32. This spring is U-shaped and has a flange 40 lying generally in the plane of finger 38 and at right angles to the legs 34, 36 of the U. The flange 40 lies beneath the horizontal portion of the channel beam 16 and receives the rivet 41. The resilient finger 38 is of the same thickness and width as rigid finger 30 and will fit in the groove provided in the duct. The leaf spring 32 is, of course, made from resilient spring steel and is depressible along the axis of the central beam 16. For a tight fit the distance from the end of finger 30 to the end of finger 38 must be greater than the inside diameter of the duct.

To insert the damper within a duct, the leaves 24 and 26 are held together against the tension of springs 60 and 62. The finger element 30 is then inserted in the groove which is going to support the damper within the duct. The leaf spring 32 is then depressed to retract the finger 38. This permits the finger 38 to clear the inner diameter of the duct. The finger 38 is then inserted in the groove at a point diametrically opposite the point where the finger 30 is lodged. The spring snaps the finger 38 into place and holds the damper securely. If desired, the resilient finger 38 may be inserted first in the groove and the spring 32 depressed to permit insertion of the rigid finger 30.

It will be apparent that the resilient finger 38 may be mounted in a different manner while maintaining its ability to be axially depressed. The U-shaped leaf spring is only one convenient way to mount the finger 38. It is essential only that it be depressible longitudinally of the central beam member. Likewise, the damper leaf construction and method of attachment may be modified as dictated by the need of the particular installation. It will be appreciated that fluid flow from small diameter duct 11 to the larger diameter diffuser box and the duct (not shown) connecting thereto is smooth (not turbulent) because the leaves 24, 26 open into the larger diameter member. The direction of flow is indicated by arrows in FIGURE 5. There is, therefore, no interference with the normal drop in pressure and velocity which occurs as the fluid expands into the larger space of box 10. This is important in air heating and cooling systems where air of high velocity is passed through small diameter (and thus, low cost) ducts to the point of discharge at low velocity into the room to be air conditioned.

Other modifications of the invention will occur to those skilled in the art. It is, therefore, my intention not to limit this invention other than as necessitated by the scope of the appended claims.

What I claim is:

1. A damper adapted to snap into a groove in a duct comprising a central beam member shorter than the diameter of said duct, a pair of semi-circular leaves, one hinged to either side of said beam, a rigid flat finger extending from one end of said beam, the free edge of said finger being adapted to fit into said groove in non-rotatable relation, a generally U-shaped leaf spring having horizontal flanges extending from the ends thereof, one said flange being secured to the other end of said beam, the other free flange constituting a flat resilient finger adapted to fit into said groove in nonrotatable relation at a position diametrically opposite said rigid finger, said rigid finger and spring being integrally connected to said beam to prevent rotation of the beam with respect to said groove.

2. The damper of claim 1 which includes resilient means for normally biasing said leaves into a plane parallel with the plane of said rigid and resilient flat fingers, and actuating means for pulling the free ends of said leaves toward each other against the force of said resilient means.

3. A damper adapted to snap into a peripheral internal groove in a duct comprising a U-shaped central beam shorter than the diameter of said duct, a pair of semi-circular leaves, one hinged to either side of said beam, a flat rigid finger extending from one end of said beam in a plane parallel to the plane of said damper, the free edge of said finger being adapted to fit into said groove, in non-rotatable relation and a leaf spring secured to the other end of said beam terminating in a similar finger depressible longitudinally thereof, said latter finger being adapted to fit into said groove in non-rotatable relation at a position diametrically opposite said rigid finger to hold the damper within the duct substantially parallel with said peripheral groove.

4. A damper adapted to snap into a groove in a duct comprising a central beam member shorter than the diameter of said duct, a pair of semi-circular leaves, one hinged to either side of said beam, a rigid flat finger extending from one end of said beam, the free edge thereof being adapted to fit into said groove in non-rotatable relation, a similar flat finger resiliently secured to the other end of said beam and depressible longitudinally thereof, the free edge of said resiliently-mounted finger being adapted to fit into said groove in non-rotatable relation at a position diametrically opposite said rigid finger, said rigid and resilient fingers being fixed to said beam to prevent rotation of the beam with respect thereto, a bracket depending from said central beam member having a guide opening therethrough, and a pair of flexible tension members connected to said leaves and adapted to pass through said guide opening, whereby said leaves are drawn together to open the damper as force is applied to said tension members.

5. In combination, a first duct of one diameter connected to a second duct of larger diameter, an internal circumferential groove at the joint between said ducts, a butterfly damper removably mounted at said joint for regulating fluid flow from said first duct to said second duct, said damper having a central beam with a semi-circular leaf hinged on either side thereof for pivotal movement into said second duct, a pair of flat fingers extending from either end of said beam and having the free edges thereof lodged in said groove at diametrically opposite points to hold the damper within the duct substantially parallel with said circumferential groove when the leaves are in closed position, at least one of said fingers being axially depressible to facilitate removal of said damper, whereby fluid flowing from said first duct is deflected to each side of said central beam by said leaves into said second duct for flow at reduced velocity.

6. A damper adapted to snap into an internal peripheral groove in a duct comprising a central beam member shorter than the distance across said duct, a pair of leaves, one hinged to either side of said beam, means for normally biasing said hinged leaves into a plane parallel with a plane through said peripheral groove, a flat finger integrally connected to each end of said beam in non-rotatable relation, said fingers being adapted to fit into said groove to lock said beam against rotation within said duct, at least one of said fingers being axially depressible to facilitate insertion and removal of said damper in said duct without deforming the duct.

References Cited in the file of this patent

UNITED STATES PATENTS

| | | |
|---|---|---|
| 1,125,503 | Fleck | Jan. 19, 1915 |
| 2,490,232 | Rozas | Dec. 6, 1949 |
| 2,510,745 | Kilgore | June 6, 1950 |